United States Patent [19]

Wood

[11] 4,241,537

[45] Dec. 30, 1980

[54] PLANT GROWTH MEDIA UTILIZING POLYURETHANE HYDROGEL

[75] Inventor: Louis L. Wood, Rockville, Md.

[73] Assignee: W. R. Grace & Co., New York, N.Y.

[21] Appl. No.: 37,928

[22] Filed: May 10, 1979

[51] Int. Cl.³ ............................................. A01G 9/10
[52] U.S. Cl. ............................................ 47/77; 47/56; 47/57.6; 47/84; 47/DIG. 7; 521/174; 521/905; 521/914
[58] Field of Search .................... 47/DIG. 7, 57.6, 66, 47/73–74, 77, 84, 86–87, 59, 63–64, 58; 521/174, 905, 914

[56] References Cited

U.S. PATENT DOCUMENTS

| | | | |
|---|---|---|---|
| 2,965,584 | 12/1960 | Elkin | 47/DIG. 7 |
| 2,971,292 | 2/1961 | Malecki | 47/58 |
| 3,336,129 | 8/1967 | Herrett et al. | 47/DIG. 7 |
| 3,373,009 | 3/1968 | Pruitt et al. | 47/DIG. 7 |
| 3,889,417 | 6/1975 | Wood et al. | 47/58 |
| 3,900,378 | 8/1975 | Yen et al. | 47/DIG. 7 |
| 3,973,355 | 8/1976 | McKenzie | 47/57.6 |
| 4,034,508 | 7/1977 | Dedolph | 47/84 |

*Primary Examiner*—Robert E. Bagwill
*Attorney, Agent, or Firm*—Richard P. Plunkett; William W. McDowell, Jr.

[57] ABSTRACT

A plant growth media in the form of a gel which is useful for growing plants in the form of seeds, seedlings, cuttings, nursery stock, etc., is obtained by dissolving a water-soluble polyisocyanate capped prepolymer containing said growing plant in an aqueous medium optionally containing various plant growth additives such as fertilizer, agricultural modified minerals and the like. The media can be formed in a variety of shapes.

23 Claims, 5 Drawing Figures

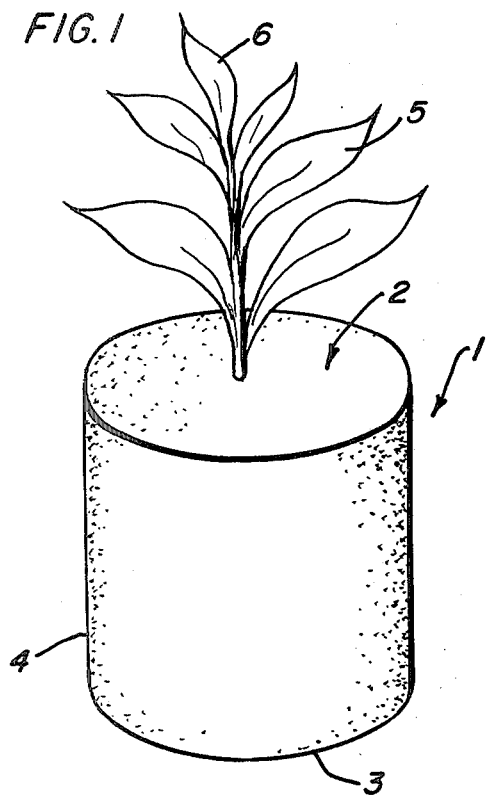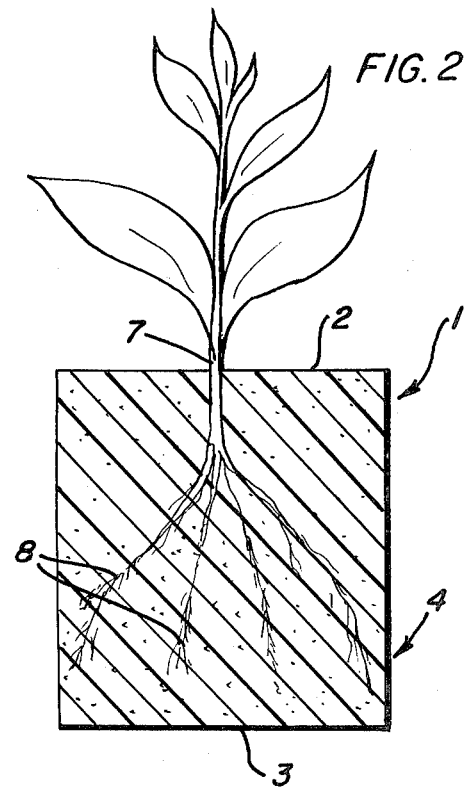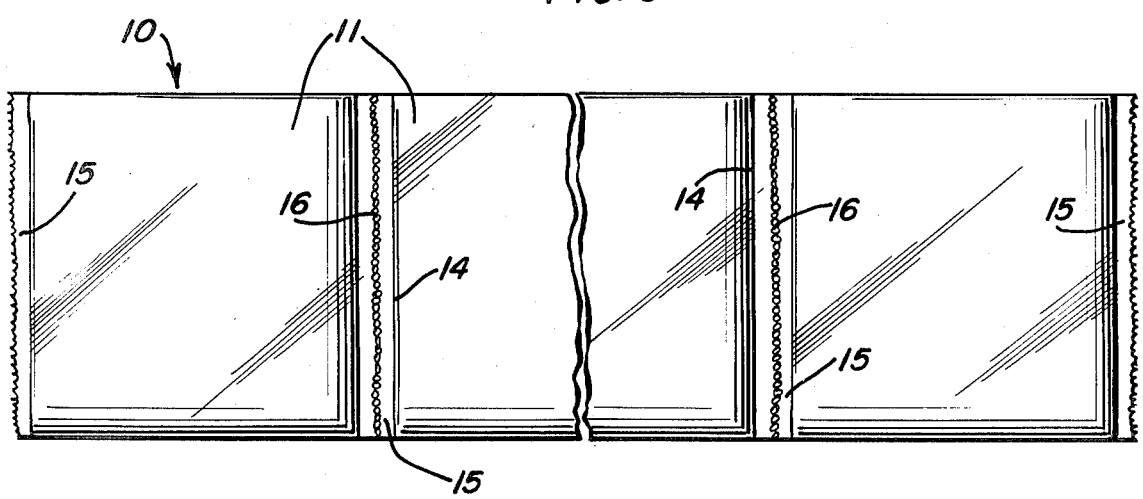

PLANT GROWTH MEDIA UTILIZING POLYURETHANE HYDROGEL

BACKGROUND OF THE INVENTION

1. Field of the Invention

The present invention relates to a plant growth media comprising a polyurethane gel composition and an article containing same. The invention also relates to a method of utilizing the plant growth media.

2. Description of the Prior Art

Polyurethane gel production is known. The Windemuth et al U.S. Pat. No. 2,948,691 discloses that isocyanate modified polyglycolethers, especially those having a molecular weight higher than 2,000, are soluble in water. These polymers are prepared by reacting polyglycolethers having at least two terminal hydroxyl groups with either mono- or polyfunctional aliphatic or aromatic isocyanates. Aqueous solutions prepared with these materials are not stable because of the high reactivity of the isocyanate group in water. Thickening or gel formation is said to occur with increasing molecular weight within an interval of some minutes depending on the solid content of the solution.

For example, a solution of 4 percent of an isocyanate modified polyglycolether prepared from a polyglycolether of the molecular weight of 4,030, which is obtained by the addition of ethylene oxide to trimethylolpropane, produces a gelatinous mass. In another example an isocyanate modified polyglycolether containing 3.2 percent of NCO groups, was obtained from a polyglycolether based on the addition of ethylene oxide to trimethylolpropane and toluene diisocyanate. Upon stirring the product into water it solidified into an insoluble gel with the evolution of carbon dioxide which was perceived by the formation of bubbles in the gel, especially when large quantities of isocyanate are used. Windemuth discloses this gel-forming reaction as being adapted to the thickening of aqueous solutions or emulsions. Windemuth's reaction products of the polyglycolether and the isocyanate are summarized as being used for producing plasticizers, lubricants, plastics, spongy materials, gel formers, thickening agents, auxiliaries in textile industry and the like, with no teaching or suggestion of plant growth media use.

In the Asao et al U.S. Pat. No. 3,719,050 a polyurethane prepolymer having terminal isocyanate groups is reacted with water in the soil to gel the polyurethane prepolymer and solidify the soil. The elastomer formed is said to have excellent strength and to strongly adhere to the soil to improve the soil properties.

The polyurethane prepolymer of Asao et al is synthesized from 2 to 8 moles of polyisocyanate per mole of a polyalkylene oxide compound. The alkylene oxides employed include ethylene oxide (EO), propylene oxide (PO), butylene oxide (BO), as well as styrene oxide and epichlorohydrin. In preferred embodiments the prepolymer is obtained as a reaction product of an ethylene oxide-propylene oxide copolymer having an ethylene oxide unit and propylene oxide unit in a ratio of from 90/10 to 70/30, which is reacted with an isocyanate compound having at least two isocyanate groups.

The polyurethane prepolymer is liquid or pasty at room temperature, and when added to 97 to 85 percent by weight of water, it readily dissolves, thereby forming a transparent solution, or is dispersed homogeneously therein to form an emulsion. The aqueous solution or emulsion is converted in a period of 20 seconds to two hours to a water-insoluble water-containing plastic material having a high elasticity. The polymerization of the urethane prepolymer by the cross-linking reaction with water produces carbon dioxide. Since the carbon dioxide gas produced is dissolved in the water present in the system, the resultant water-containing plastic material is a gel with a slight increase in volume owing to the gas formation.

The only utility of this polyurethane prepolymer is to form a gel used to solidify and stabilize soil. Inorganic materials such as clay, cement and the like can be mixed with the prepolymer and then injected into the soil. The elastomer which forms is said to have an extremely excellent strength and it markedly improves the soil in view of its strong adherence to the soil.

The Harada et al. U.S. Pat. No. 4,118,354 discloses a similar gel produced by dispersing a reaction product obtained by the reaction of a polyisocyanate having at least two isocyanate groups with a polyether. The polyether comprises a plurality of alkylene oxides, 50 to 90 percent by weight of which is ethylene oxide, added at random to a polyalcohol having at least two terminal hydroxyl groups. The alkylene oxides are added in an amount of an average molecular weight within the range of 1,000 to 4,000 per each hydroxyl terminal group of the polyalcohol.

The disclosed utility of these gels is in disposing of various sludges of the bottom of rivers, seas, and sludges removed from organic and inorganic waste liquids and sewage. The polyurethane hydrogels are also employed in disposing of liquid wastes released from breweries, papermills, dye works, tanneries, slaughter houses, etc. Further, aqueous solutions containing noxious metals and radioactive substances are said to be effectively confined within the polyurethane hydrogel to prevent them from being scattered.

In each of the Windemuth et al, Asao et al and Harada et al patent references, there is no discussion of using their gel compositions as a plant growth media.

Other types of polyurethanes have been used to form substrates for plant breeding and cultivation. The polyurethanes disclosed in the patents, however, result in the formation of hydrophilic polyurethane open celled foams and not gels. See U.S. Pat. Nos. 3,706,678, 4,034,508 and 4,035,951. That is, when the prepolymer used in these patents is mixed with water, the large concentration of NCO groups react with water to generate a substantial amount of carbon dioxide ($CO_2$). Since these compositions are not based on prepolymer compositions which dissolve in water to form a solution prior to reaction, they do not form gels.

3. Objects of the Invention

It is an object of this invention to obtain a polyurethane gel that can act as a plant growth media supplying water to the plants.

It is a further object to produce a plant growth media from a polyurethane gel composition that can be readily made by dissolving a prepolymer containing plant seeds in an aqueous slurry.

It is a further object to obtain a plant growth media from a polyurethane gel composition which is made from a hydrophilic polyurethane prepolymer having terminal NCO groups and being capable of dissolving completely in an aqueous slurry.

These and other objects of the invention will become apparent from the description of this invention hereinafter.

BRIEF DESCRIPTION OF THE DRAWINGS

FIG. 1 is a perspective view of the gel soil plug with a growing plant therein in accordance with and embodying the instant invention.

FIG. 2 is a vertical section view through the gel soil plug of FIG. 1.

FIG. 3 is a side view of a flexible compartmented tape, each compartment of which contains a portion of a gellable prepolymer with a plant growth therein and which is readily separable from the other compartments.

DESCRIPTION OF THE PREFERRED EMBODIMENTS

Figure 4:
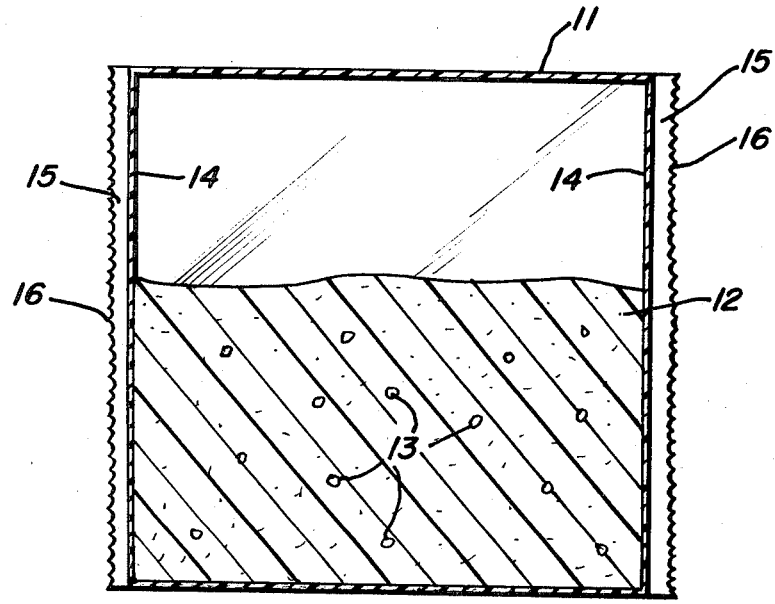
FIG. 4 is an expanded view of a vertical section of a compartment in FIG. 3 containing the gellable prepolymer and plant growth.

Referring to FIGS. 1 and 2 of the drawings, there is depicted a gel soil plug with a growing plant therein in accord with and encompassing the principles of the instant invention. The gel soil plug 1 is generally shaped cylindrically, having a flat top 2, a flat bottom 3 and a cylindrical side wall 4. Held in the gel soil plug 1 is a growing plant 5, the plant 5 including a top or leaves 6, a stalk 7 and roots 8. In accord with the invention, the roots 8 are distributed in the adjacent portions of the gel soil plug 1 and are molded therein. The stalk 7 is also molded in the gel soil plug 1 and extends through the top 2 allowing the leaves 6 of the plants to be exposed to sunlight in the usual manner.

The soil plug 1 is formed of a body of elastomeric hydrophilic crosslinked polymer which binds a quantity of water into a cohesive gelled mass. The amount of bound water can range from 50 to 95% by weight of the prepolymer used to form the gel soil plug 1. One advantage of the gel soil plug 1 is its ability to give up a major portion of its water to the roots 8 of the growing plant 5, thereby aiding and abetting its growth. Additionally, the water prior to admixture with the prepolymer to form the gel soil plug 1 can optionally contain plant growth additives such as agricultural modified minerals, buffers and fertilizers none of which are illustrated in the drawings. Such minerals include vermiculite and perlite. Fertilizers operable herein can be water insoluble, but water soluble fertilizers such as ammonium polyphosphate, $KNO_3$, $K_2HPO_4$ and $KNH_3HPO_4$ are preferred. The preferred prepolymer to form the gel soil plug 1 is a synthetic organic material such as a hydrophilic isocyanate-capped urethane-containing prepolymer which on reaction with water provides a gel body extending throughout gel soil plug 1. Such a gel structure securely holds the growing plant 5 while providing a reservoir of water to feed the growing plant 5 and optionally buffers, minerals and fertilizers.

Figure 5:
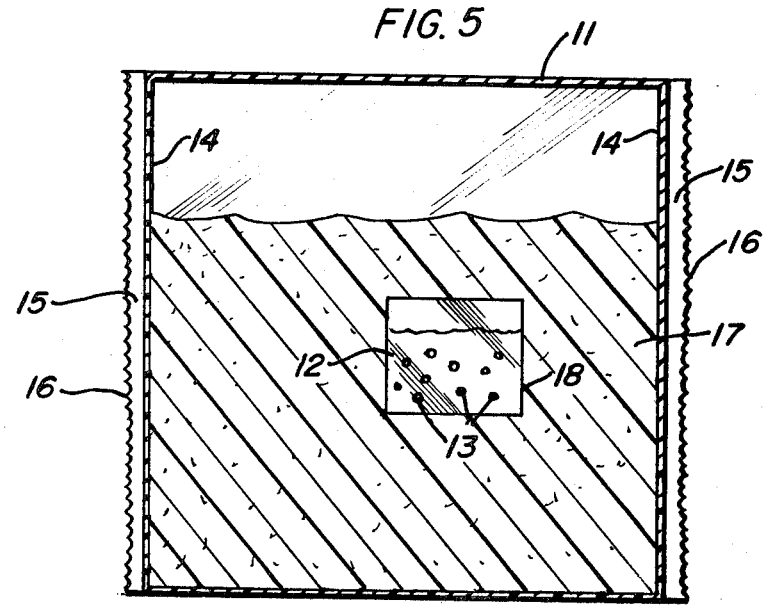
FIG. 5 is an expanded view of a vertical section of a compartment in FIG. 3 with the variation that the compartment contains an aqueous reactant and the gellable prepolymer and plant growth are separated therefrom in the compartment by means of a rupturable container.

In FIGS. 3 and 4 of the drawings, there is illustrated a novel package for marketing the prepolymer used to form the gel soil plug 1 with the growing plant 5 therein in accord with and embodying the principles of the instant invention. As illustrated, the package includes container in the form of a flexible compartmented plastic tube 10 of infinite length as compared to width, windable upon itself and formed into compartments 11 containing the prepolymer 12 with growing plant 5 in the form of seeds 13 therein. The thus filled plastic tube 10 is compartmentized by heat sealing the tube 10 at regular intervals to form tube sides 14 between heat seals 15. The heat seals 15 are also subjected to a line serration thereacross to form serrated portions 16 to facilitate separation of one compartment 11 from another, if desired as shown in FIG. 4. For planting, the coilable compartmented plastic tube 10 can be unwound to its full length or divided at desired serrated portions 16, as required, and placed in a dug-out row in the soil. The exposed portion of each compartment 11 of the compartment plastic tube 10 is then punctured or ruptured. Water is added by means of a hose, sprinkler, pipes or watering can to the prepolymer 12 containing seeds 13, thereby forming the gel soil plug 1 in situ in each compartment 11. A variation of this method is shown in FIG. 5. Therein the flexible, compartmented plastic tube 10 contains in each compartment 11 water 17 and a smaller rupturable water barrier container 18 having therein prepolymer 12 and seeds 13. In each compartment 11 the ratio of the amount of prepolymer to water is preset and falls within the range set out in the discussion hereinafter. Preferably, the water 17, but also the rupturable water barrier container 18, may also optionally contain plant growth additives such as modified agricultural minerals, e.g., vermiculite and perlite; pH regulators and fertilizers, preferably water-soluble fertilizers, such as $KNO_3$, $K_2HPO_4$, $KNH_3HPO_4$ and ammonium polyphosphates, all not shown in FIG. 5. The rupturable water barrier container 18 can be made from thin films, i.e., 0.5 to 2 mils thick of various plastic materials such as polyethylene, polyvinyl chloride, polypropylene and the like. In this embodiment of the present invention, the gel soil plug is formed by bursting the smaller, rupturable water barrier container 18 by hand pressure or other conventional means, thereby allowing the water 17, prepolymer 12 and seeds 13 to admix. Since all that is required herein to form the gel soil plug 1 is the admixture of the water 17 with the prepolymer 12, a water barrier must be maintained therebetween to insure that gellation, before desired, does not occur. Shaking of compartments 11 will facilitate said admixing. After a short period of time, less than about 5 minutes, a gel soil plug 1 in the form of compartment 11 containing seeds 13 is formed. The compartmented tube 10 containing the gel soil plugs 1 can then be positioned as desired, e.g., indoors under proper lighting or in the soil outdoors, and the exposed portion of the compartments 11 can be slit or otherwise broken, thereby exposing the gel soil plug 1 with growing seeds 13 to light or sunlight.

The container for the plant growth 5 and prepolymer 12 or gel soil plug 1 can be formed in various shapes and sizes from various materials. Thus, as exemplified in FIGS. 1 and 2, the container for the soil plug can be an open ended article such as ceramic or plastic flower pots, peat pots, glass enclosures such as bottles and the like. FIGS. 3-5 depict containers which totally enclose the plant growth 5, prepolymer 12 or gel soil plug 1 in the form of a flexible compartmented tube or sealable tape using conventional plastic materials which are readily ruptured when desired. Other conventional containers are well known to those skilled in the art and are operable herein.

SUMMARY OF THE INVENTION

A plant growth media which is useful for protecting, holding or transplanting growing plants in the form of seeds, seedlings, tubers, cuttings, nursery stock, roots, transplants and the like is obtained by dissolving a special water-soluble polyisocyanate prepolymer containing said growing plant in an aqueous medium. Upon mixing the prepolymer and aqueous medium together, a gel composition is obtained. This mixture forms a gel of water held in a homogeneous network of a swollen, hydrophilic, crosslinked polyurethane with the growing plant either alone or in combination with fertilizer, agricultural modified minerals and the like uniformly dispersed throughout. Eventually, the water evaporates or is taken up by the plant growth, leaving a polyurethane mass with a large solids content including the growing plant. Optionally, either the prepolymer or the aqueous medium can also contain additives such as peat, vermiculite, perlite, fertilizer and other well known aids to plant growth. The gelled media with plant therein can be readily transplanted, if and when desired.

The water-soluble polyisocyanate prepolymer can be made from a polyether polyol which contains enough oxyethylene units to make the prepolymer water soluble. In order to permit cross-linking of the prepolymer, one embodiment employs a polyol which has more than two hydroxyl groups. Each of these hydroxyl groups can be capped with conventional diisocyanates such as toluene diisocyanate to yield the water-soluble polyisocyanate capped prepolymer. In another embodiment, the cross-linked prepolymer structure can be obtained by selecting a diol, as the polyol, as the basic unit of the prepolymer with the isocyanate capping being done with a polyisocyanate having greater than two NCO groups per molecule. Combinations of the above or the addition of crosslinking agents containing at least three functional groups reactive with the NCO groups, e.g., amine, hydroxy, thiol or carboxylate groups to either type prepolymer, are also operable herein.

The NCO groups on the prepolymer produce carbon dioxide when contacted with water. To insure that a gel is formed rather than a conventional polyurethane foam, the effective amount of NCO groups per prepolymer molecule must be reduced. This is done by utilizing relatively large polyol molecules between the terminal NCO groups. For gel formation herein the polyol should have not more than one OH group/1000 molecular weight and a total molecular weight of at least 2,000. Hence when the hydroxyl groups of a large triol molecule are capped with a diisocyanate, for example, the number average molecular weight of the prepolymer obtained is at least 3,000. The prepolymer is employed in the range of 1 to 100 parts per 100 parts of water and preferably in the range of about 1–20 parts per 100 parts of water. The water phase may also contain large quantities of plant growth additives. Care must be taken when smaller amounts of prepolymer are employed since there may not be enough resin to hold together the large amounts of additives. Larger amounts of prepolymer can be employed with the added benefit of greater strength.

DETAILED DESCRIPTION OF THE PREFERRED EMBODIMENTS

The prepolymer used in making the gels has a relatively large molecular weight with a relatively low amount of NCO per unit weight. Foams, on the other hand, have a much larger concentration of NCO group per weight of the prepolymer. For example, the foams described in the Murch et al. U.S. Pat. No. 4,066,578 have about two equivalents of NCO per 1000 grams of the prepolymer where one equivalent of NCO weighs 42 grams. This concentration can also be expressed as two milliequivalents of NCO per gram of prepolymer and written as 2 meq. NCO/g. The present gels have considerably less NCO groups on the order of about 1.0 meq. NCO/g or less. Thus there is a great deal more of the hydrophilic polymer between each terminal NCO group which by itself is hydrophobic. As a result the overall prepolymer is hydrophilic and dissolves completely in water.

One technique for making the low NCO concentration prepolymer is to chain-extend a polyol with polyoxyalkylene units. Using the triol, glycerol with units of ethylene oxide and/or propylene oxide as an example, the following prepolymer forming polyol can be obtained:

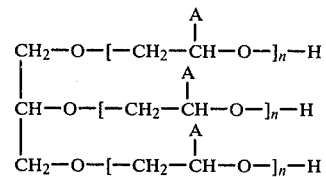

with the value of n being about 10 to 50 and where A can be H of CH$_3$. When A is H, the bracketed unit is an ethylene oxide (EO) unit and when A is CH$_3$, the unit is propylene oxide (PO). The amount of propylene oxide (PO) employed must be limited since the prepolymer will not have the necessary hydrophilicity if only PO is used. In the case where just PO and EO are used, the amount of PO to the total PO+EO should be less than about 50 percent so the prepolymer will dissolve in water.

This particular trifunctional polyol is then reacted with a diisocyanate to provide the prepolymer having urethane linkages and terminal isocyanate groups as follows:

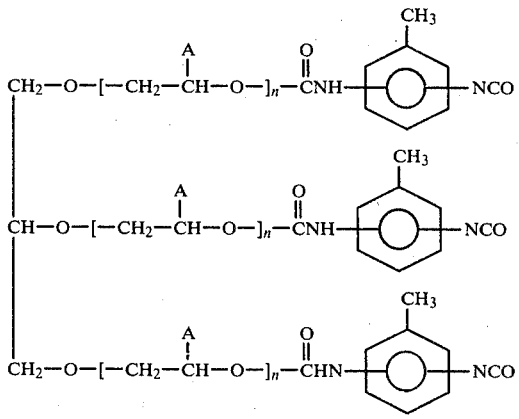

The selection of the polyoxyalkylene component depends on the conditions employed when the isocyanate capped prepolymer is subsequently dissolved in water to form the gel. A polyoxyalkylene made of just ethylene oxide units will be hydrophilic and dissolve in water, but it is a solid at room temperature. This may cause a problem during gel formation. That is, while waiting for the last of the solid prepolymer to slowly dissolve in water, the part that has already dissolved may prematurely begin to form the gel, so that a homogeneous gel is not obtained. To avoid this problem, it is advantageous to have the prepolymer in a liquid form so it can readily dissolve without heating, which increases the gelation rate, and mix with the water to form the gel. A prepolymer which is a liquid at room temperature can be obtained by incorporating various amounts of a relatively hydrophobic comonomer into the ethylene oxide based polymerization product. Comonomers such as propylene oxide (PO) described in the example above or butylene oxide (BO) may be copolymerized as a random copolymer, a block copolymer, or both, such that the resulting copolymer remains hydrophilic. Random copolymerization is especially preferred to insure obtaining a liquid prepolymer having a low viscosity.

The addition of these comonomers also provides other desirable features for certain applications, namely improved low temperature flexibility, resiliency and the like. As discussed earlier, up to about 50 mole percent of a relatively hydrophobic comonomer such as propylene oxide may be copolymerized with the ethylene oxide monomer and still yield hydrophilic crosslinked network gels when those products are used as polyol intermediates in practicing the present invention. Preferred prepolymers have only up to about 30 mole percent of the relatively hydrophobic comonomer. Thus, throughout this text the term "polyoxyethylene polyol" is intended to include not only a homopolymer of ethylene oxide, but also hydrophilic copolymers of ethylene oxide such as those described above wherein all of the polyol derivatives have a hydroxyl functionality of about two or greater and an ethylene oxide content greater than about 50, and preferably greater than about 70 mole percent, not more than one OH group/1,000 molecular weight and a total molecular weight of at least 2,000.

However, as indicated in the Asao et al U.S. Pat. No. 3,719,050 discussed earlier, larger amounts of alkylene oxides other than ethylene oxide might be employed to obtain a gel involving an emulsion rather than a true solution.

The prepolymers do not have to be liquid. If the gel forming operation is carried out at an elevated temperature, then the prepolymer can be melted to the liquid state at that higher temperature. This liquid melt can then readily mix with the water to form the homogeneous gel. In addition, if the capping polyisocyanate is selected as one having a relatively low reactivity, then it may be acceptable to use a solid prepolymer and to wait for the solid to dissolve at room temperature because the gel forming reaction will not yet have begun.

Prepolymer forming polyols can also be made by reacting EO, either per se or copolymerized with PO or BO with polyols such as glycerol,
1,2,6-hexanetriol, 1,1,1,-trimethylolpropane,
3-(2-hydroxyethoxy)-1,2-propanediol,
3-(2-hydroxypropoxy)-1,2-propanediol,
2,4-dimethyl-2-(2-hydroxyethoxy)-methylpentanediol-1,5,
1,1,1-tris[(2-hydroxyethoxy)methyl]ethane,
1,1,1,-tris-[(2-hydroxypropoxy)methyl]propane, triethanolamine, triisopropanolamine, pyrogallol and phloroglucinol.

The chain extended polyols of the instant invention can be capped with a polyisocyanate to form the prepolymer. Polyisocyanates operable herein to form prepolymers for making hydrogels are of the formula R-(NCO)$_n$ wherein n is 2-4 and R is a polyvalent organic moiety having the valence of n. The polyisocyanate is reacted with the chain-extended polyol of the present invention in an amount ranging from stoichiometric up to a 20% excess per equivalent OH in the polyol. The prepolymer forming reaction is carried out at a temperature in the range 20°-100° C. preferably 30°-60° C. Although the reaction is operable under atmospheric conditions, it is preferably carried out in an inert, moisture free medium, e.g., under a nitrogen blanket. Suitable polyisocyanates useful in preparing this type of prepolymer include, but are not limited to,
toluene-2,4-diisocyanate, toluene-2,6-diisocyanate, commercial mixtures of toluene-2,4- and 2,6-diisocyanates, ethylene diisocyanate, ethylidene diisocyanate,
propylene-1,2-diisocyanate, cyclohexylene-1,2-diisocyanate,
cyclohexylene-1,4-diisocyanate, m-phenylene diisocyanate,
3,3'-diphenyl-4,4'-biphenylene diisocyanate, 4,4'-biphenylene diisocyanate, 3,3'-dichloro-4,4'-biphenylene diisocyanate,
1,6-hexamethylene diisocyanate, 1,4-tetramethylene diisocyanate, 1,10-decamethylene diisocyanate,
1,5-naphthalenediisocyanate, cumene-2,4-diisocyanate,
4-methoxy-1,3-phenylenediisocyanate,
4-chloro-1,3-phenylenediisocyanate,
4-bromo-1,3-phenlenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate, 4,4'-diisocyanatodiphenylether, benzidinediisocyanate,
4,6-dimethyl-1,3-phenylenediisocyanate,
9,10-anthracenediisocyanate, 4,4'diisocyanatodibenzyl,
3,3'dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl, 4,4'-methylene bis(diphenylisocyanate), 4,4'-methylene bis(dicyclohexylisocyanate), 1,4-anthracenediisocyanate,
2,5-fluorenediisocyanate, 1,8-naphthalenediisocyanate and
2,6-diisocyanatobenzfuran.

Also suitable are aliphatic polyisocyanates such as the triisocyanate Desmodur N-100 sold by Mobay which is a biuret adduct of hexamethylenediisocyanate; the diisocyanate Hylene W sold by DuPont, which is 4,4'-dicyclohexylmethane diisocyanate; the diisocyanate IPDI or isophorone diisocyanate sold by Thorson Chemical Corp., which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

Another technique to produce the prepolymer is to use a polyfunctional isocyanate having a functionality greater than 2 to end-cap a chain-extended polyol containing two or more OH groups. Suitable polyisocyanates useful in this technique include PAPI (a polyaryl polyisocyanate commercial product sold by the Upjohn Company as defined in U.S. Pat. No. 2,683,730), 2,4,6- toluene-triisocyanate and 4,4'4''-triphenylmethane triisocyanate.

Suitable starting diols which can be reacted with EO per se or EO copolymerized with PO or BO to form a chain-extended diols for preparing prepolymers include ethylene glycol, propylene glycol, trimethylene glycol, 1,2-butylene glycol,
1,3-butanediol, 1,4-butanediol, 1,5-pentanediol, 1,2-hexylene glycol, 1,10-decanediol, 1,2-cyclohexanediol,
2-butene-1,4-diol, 3-cyclohexene-1,1-dimethanol,
4-methyl-3-cyclohexene-1,-dimethanol,
3-methylene-1,5-pentanediol, diethylene glycol, resorcinol, hydroquinone, 4,6-di-tertiarybutyl catechol and catechol.

These prepolymers, having a functionality greater than 2, if desired, can be used in combination with a difunctional reactive member, such as one having reactive amine, hydroxy, thiol or carboxylate sites to form a 3-dimensional crosslinked gel product. Useful difunctional reactive members include, but are not limited to, ethylenediamine, trimethylenediamine, tetramethylenediamine, pentamethylenediamine, hexamethylenediamine, aminoethanol, hydrazine, 4,4'-methylenebis(p-chloraniline) and the like.

As discussed above, particularly useful gels may be prepared by first capping a polyoxyethylene polyol with a polyisocyanate such that the capped product has a reaction functionality greater than 2. Thereafter, the resin is reacted by dissolving it in water such that a crosslinked gel results.

It is also possible to use an isocyanate capped, polyoxyethylene polyol having a functionality approximating 2, in which case a polyfunctional reactive member such as one having 3 to 8 reactive amine, hydroxy, thiol or carboxylate sites per average molecule is included to form a three dimensional crosslinked product. The reactive member preferably is one that is reactive enough with the isocyanate groups to compete with the reaction of the water with the isocyanate groups. Useful polyfunctional reactive members are amines which include materials such as diethylenetriamine, triethylenetetramine, tetraethylenepentamine, polyethyleneamine, tolylene-2,4,6-triamine, diethanolamine, triethanolamine, and the like.

To produce the gel, the prepolymer containing the growing plant in some form e.g., seeds, seeds embedded in growth cubes, seedlings, etc. is dissolved in water which can contain plant growth additives such as fertilizer. Although any conventional fertilizer in amounts ranging up to the weight of the aqueous medium is operable, fertilizers used herein are preferably those that dissolve in the aqueous phase such as ammonium polyphosphate and $KNO_3$. Some of the terminal NCO groups react with water to form a carbamate compound which is unstable at room temperature and which breaks down to form an amine. The amine in turn reacts with another chain terminated NCO group to form a urea linkage to join the two chains. The reaction can be illustrated as follows:

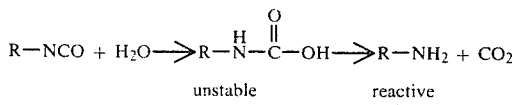

unstable   reactive amine

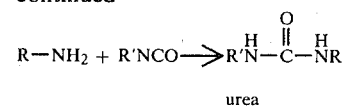

urea

If desired, suitable surfactants/suspending agents, often described as solution thickeners, can be added to the water in amounts ranging from 0.1 to 5% preferably 0.5 to 2% by weight of the prepolymer. Such materials include but are not limited to non-ionic cellulosic polymers such as hydroxyethyl cellulose polymers (e.g., Natrosol, such as Natrosol 250HH, by Hercules, or Cellosize by Union Carbide), hydroxypropyl cellulose (e.g., Klucel by Hercules), ethylhydroxyethyl cellulose (e.g., EHEC by Hercules), and ethyl cellulose. In addition to non-ionic cellulosic polymers, other appropriate non-ionic suspending agents include water-soluble polyoxyethylene polymers (e.g., Polyox by Union Carbide), gelatin, guar gum and agar.

Examples of suitable amphoteric and cationic surfactants are set forth in U.S. Pat. No. 4,066,578, which has been incorporated by reference into the present application. Suitable non-ionic surfactants include sorbitan trioleate(e.g., Arlacel 85 by ICI), polyoxyethylene sorbitol oleate (e.g., Atlas G 1186 by ICI), polyoxyethylene sorbitan monolaurate (e.g., Tween 21 by ICI), polyoxyethylene lauryl ether (e.g., Brij 30 by ICI), polyoxyethylene stearyl ether (e.g., Brij 72 by ICI), silicon glycol copolymer (Dow Corning 190), fluorochemical surfactants (e.g., Zonyl FSN by E. I. DuPont and Fluorad FC 170C by 3M), condensates of ethylene oxide and propylene oxide with propylene glycol (e.g., Pluronic L62, Pluronic L64, Pluronic P75 by BASF Wyandotte), and organosilicone surfactants (e.g., L520 by Union Carbide).

In addition, reinforcing agents can also be added to the mixture to improve the strength of the resulting gel. Many types of fibers can be used for this purpose, such as wood, carbon, glass, polyolefin, polyester, polyamide, cellulosic and polyvinyl alcohol fibers; mineral wool; metal fibers; etc.

The following examples will aid in explaining, but expressly not limit, the instant invention. Unless otherwise noted, all parts and percentages are by weight.

EXAMPLE 1

Preparation of Gellable Prepolymer

Seven hundred fifty grams of the polyether triol XD1421 made by Dow Chemical Company and composed of a ratio of three oxyethylene units randomly copolymerized per one oxypropylene to a molecular weight of around 4900 and having 0.61 meq. OH/g. was reacted at about 65° C. for 9 hours with 89.3 g. of commercially available toluene diisocyanate, i.e., a mixture made of 80 parts of 2,4-toluene diisocyanate and 20 parts of 2,6-toluene diisocyanate. The prepolymer reaction product is a pale yellow liquid of 10,000 to 13,000 cps at 25° C. and it has 0.73 meq. NCO/g.

To see if a variety of vegetable seeds and flower cuttings will germinate or root in a gel medium in plastic bags, the following experiments were performed.

EXAMPLE 2

37.5 g of the prepolymer from Example 1 along with 750 ml water containing 2.5 g of Miracle Gro (a commercially available balanced water soluble fertilizer)

were charged to a 6" by 12" by 1 mil thick polyethylene film bag. Another bag was made up using the same reactants and procedure. The bags were closed with a tie-tape, shaken and immediately placed on a flat surface to form pillows approximately 5½" by 8" by 1½" in volume. Within four minutes a gel in the form of a pillow was formed. The flat top surface of each bag was cut with a scalpel in one place to form openings 1" wide and 1" deep in the gel. In one opening 2 seeds of N-K improved, long, green cucumber were inserted, and in the other 5, seeds of W. A. Burpee Better Boy Tomatoes were inserted. Although no water was added to the system for over 50 days, both type seeds germinated.

EXAMPLE 3

Using the same procedure and reactants as in Example 2, two additional polyethylene bags containing a gel plant media were formed. One bag was slit in 10 places to form 1" wide and 1" deep slits in the gel. Into each slit were placed cuttings of Swedish ivy. In the other bag 8 slits were made and into each was placed a cutting of a Wandering Jew plant. After 50 days without water being added, six of the Swedish ivy cuttings had roots and five of the Wandering Jew cuttings had roots.

EXAMPLE 4

A polyethylene film sheet was folded over and heat sealed on 3 of its 4 edges to form a 2" by 4" pouch of ½ mil thickness. 37.5 g of the prepolymer from Example 1 was added to the pouch and the fourth side was sealed. The pouch was placed inside a 6" by 12" by 1 mil thick polyethylene bag containing 2.5 g of Miracle Gro, a balanced water soluble fertilizer powder and 750 ml water. The bag was sealed at the top with a tie-tape and its contents stood over night. No change was observed in the contents of the bag. The pouch was squeezed through the bag to rupture same and extrude most of its contents into the bag without puncturing the bag. The bag was shaken for 45 seconds and placed on a flat surface. After 5 minutes a pillow shaped bag of gel was formed which could be picked up without changing its shape. Five 1" slits 1" deep were made in the gel in the bag, and a cutting from a Wandering Jew plant was placed in each slit. Although no water was added to the bag for over 30 days, the plants rooted.

What is claimed is:

1. A soil plug comprising a plant growth in an aqueous gel of a monolithic, crosslinked, hydrophilic polyurethane.

2. The soil plug according to claim 1 wherein the plant growth is in the form of seeds, seedlings, tubers, cuttings, roots and transplants.

3. The soil plug according to claim 1 wherein the crosslinked hydrophilic polyurethane gel composition comprises the reaction product of (a) a prepolymer having a reaction functionality greater than two comprising an isocyanate-capped water-soluble polyether polyol having a molecular weight of at least 1,000/OH group with a total molecular weight of at least 2,000 and (b) an aqueous reactant, the weight ratio of prepolymer to aqueous reactant is in the range 1-100 to 100 respectively.

4. A gel composition according to claim 3 wherein the prepolymer is a liquid at room temperature.

5. A gel composition according to claim 3 wherein the polyether polyol is made of random ethylene oxide units and other alkylene oxide units with the ethylene oxide units comprising at least about 50 percent of the total number of ethylene oxide and alkylene oxide units.

6. A gel composition according to claim 5 wherein the ethylene oxide units comprise at least about 70 percent of the total number of ethylene oxide and alkylene oxide units.

7. A gel composition according to claim 5 wherein the polyether polyol is made of random ethylene oxide units and propylene oxide units.

8. A gel composition according to claim 3 wherein said prepolymer is present in the reaction mixture in an amount of about 1 to 20 parts by weight per 100 parts of water.

9. The soil plug according to claim 1 wherein the gel further comprises a fertilizer.

10. The soil plug according to claim 9 wherein the fertilizer is water-soluble.

11. The soil plug according to claim 1 wherein the gel further comprises an agricultural modified mineral.

12. The soil plug according to claim 11 wherein the agricultural modified mineral is vermiculite or perlite.

13. The soil plug according to claim 1 wherein the gel further comprises a surfactant.

14. The soil plug according to claim 13 wherein the surfactant is an amphoteric, cationic or non-ionic surfactant.

15. An article comprising a container having therein (1) a plant growth and (2) a prepolymer having a reaction functionality greater than two comprising an isocyanate-capped, water-soluble polyether polyol having a molecular weight of at least 1,000/OH group with a total molecular weight of at least 2,000.

16. The article according to claim 15 wherein the plant growth is in the form of seeds, seedlings, tubers, cuttings, roots and transplants.

17. The article according to claim 15 wherein (1) and (2) are entirely enclosed by said container and said container is a plastic film.

18. The article according to claim 15 wherein a portion of said container is open to the atmosphere.

19. The article according to claim 15 wherein the container is a tube or tape.

20. The article according to claim 19 wherein the tube or tape is plastic.

21. The article according to claim 19 wherein the tube or tape is compartmentized.

22. The article according to claim 15 wherein said article is enclosed in a larger plastic film container which larger container also contains water.

23. The article according to claim 22 wherein the water also contains a fertilizer.

* * * * *